(12) United States Patent
Tojo

(10) Patent No.: US 6,731,789 B1
(45) Date of Patent: May 4, 2004

(54) IMAGE PROCESSING APPARATUS AND METHOD, AND STORAGE MEDIUM

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,262

(22) Filed: Jan. 28, 2000

(30) Foreign Application Priority Data

Jan. 29, 1999 (JP) .......................... 11-022938
Jan. 29, 1999 (JP) .......................... 11-022939

(51) Int. Cl.$^7$ ............................... G06K 9/00
(52) U.S. Cl. .................. 382/162; 382/305; 382/165
(58) Field of Search ................. 382/162–167, 382/108, 305, 300, 284, 298–299, 274; 358/1.9, 518, 515, 448, 525, 537, 528; 345/589–593, 597–605

(56) References Cited

U.S. PATENT DOCUMENTS

| | | | | |
|---|---|---|---|---|
| 5,377,041 A | | 12/1994 | Spaulding et al. | 358/518 |
| 5,519,515 A | * | 5/1996 | Komatsu | 358/518 |
| 5,586,197 A | * | 12/1996 | Tsujimura et al. | 382/162 |
| 5,664,072 A | * | 9/1997 | Ueda et al. | 358/1.9 |
| 5,930,388 A | * | 7/1999 | Murakami et al. | 382/167 |
| 6,137,495 A | * | 10/2000 | Gondek | 345/600 |
| 6,204,935 B1 | * | 3/2001 | Soma et al. | 358/448 |
| 6,246,804 B1 | * | 6/2001 | Sato et al. | 382/284 |
| 6,400,853 B1 | * | 6/2002 | Shiiyama | 382/305 |

FOREIGN PATENT DOCUMENTS

| | | | | |
|---|---|---|---|---|
| JP | 8249349 | 9/1996 | | G06F/17/30 |
| JP | 10260983 | 9/1998 | | G06F/17/30 |

OTHER PUBLICATIONS

Tominaga, S., "Color Classification of Natural Color Images", Color Research and Application, John Wiley & Sons Inc., N.Y., USA, vol. 17, No. 4, Aug. 1, 1992, pp. 230–239.

Das, M. et al., "Indexing Flowers by Color Names Using Domain Knowledge–Driven Segmentation", Applications of Computer Vision, 1998, WACV '98, Proceedings, Fourth IEEE Workshop, Princeton, N.J., USA, pp. 94–99.

Wang J. et al., "Color Space Quantization for Color–Content–Based Query Systems", Multimedia Tools and Applications, Jan. 2001, Kluwer Academic Publishers, Netherlands, vol. 13. No. 1, pp. 73–91.

Salari, E. et al., "Texture Segmentation Using Hierarchical Wavelet Decomposition", Pattern Recognition, Pergamon Press Inc., Elmsford, N.Y., USA, vol. 28, No. 12, Dec. 1, 1995, pp. 1819–1824.

\* cited by examiner

*Primary Examiner*—Leo Boudreau
*Assistant Examiner*—Ishrat Sherali
(74) *Attorney, Agent, or Firm*—Fitzpatrick, Cella, Harper & Scinto

(57) ABSTRACT

This invention converts given color label string data into another color label string data without requiring any original image. For this purpose, a color label string input unit (2010) inputs a color label string pertaining to a source image and its attribute information. A conversion attribute destination unit (2020) designates attribute information that pertains to labeling of a destination color space. A color space matching unit (2030) attains color space matching for the input color label string on the basis of the input attribute information and designated attribute information. A block segmentation matching unit (2040) attains matching with destination blocks, and a color label string output unit (2050) generates and outputs a destination color label string.

14 Claims, 18 Drawing Sheets

FIG. 5

| COLOR SPACE |
|---|
| NUMBER OF SEGMENTED COLOR SPACE CELLS |
| NUMBER OF SEGMENTED BLOCKS (x, y) |
| LABEL STRING |

FIG. 9

| 1 | 1 | 1 | 8 |
|---|---|---|---|
| 1 | 1 | 1 | 8 |
| 1 | 1 | 1 | 20 |
| 1 | 1 | 20 | 20 |

FIG. 10

| | | | |
|---|---|---|---|
| 1 | 1 | 1 | 8 |
| 1 | 1 | 1 | 8 |
| 2 | 2 | 2 | 20 |
| 2 | 2 | 20 | 20 |

FIG. 13
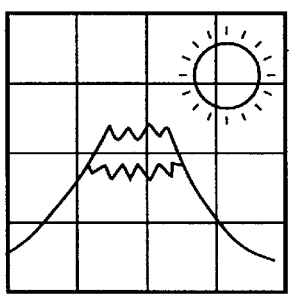
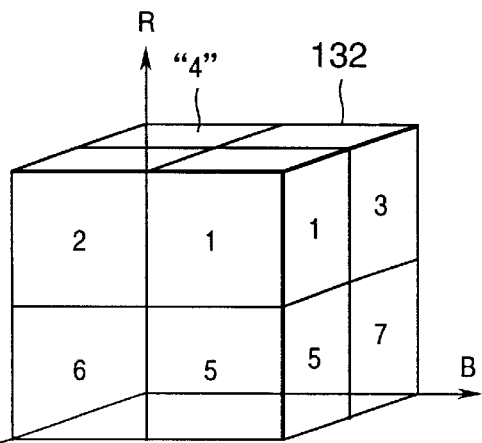
LABEL STRING = {1, 1, 2, 3, 1, 4, 5, 2, ···}
16 LABELS
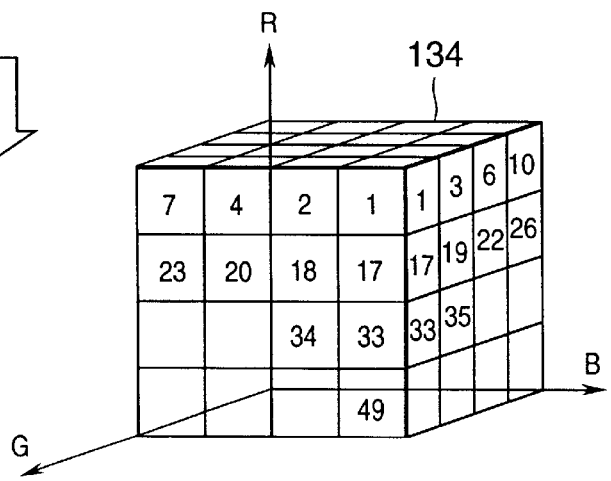
LABEL STRING = {18, 22, 62, 62}
4 LABELS

IMAGE PROCESSING APPARATUS AND METHOD, AND STORAGE MEDIUM

BACKGROUND OF THE INVENTION

The present invention relates to an image processing apparatus and method for segmenting an image into a plurality of blocks, and expressing color by a label in accordance with the feature amount of each block, and a storage medium.

In recent years, various techniques for searching, e.g., images have been proposed. Of such techniques, a technique for inputting an image used in a search (to be referred to as a query image hereinafter), and searching registered images for an image which is most similar to the query image is known. In such technique that has been developed to a given practice level, an image is segmented into a plurality of blocks, and the color histogram of each block is computed to determine the color that appears most frequently in each block. On the other hand, for example, an RGB color space is segmented into cells (small color space segments), and labels are assigned to those cells, as shown in FIG. 6. Then, the correspondence between the color that appears most frequency in a given block and the color label is determined for all the blocks to obtain a color label string.

The color label string is registered in a database, that of a query image is similarly detected, and pattern matching between these color labels is made to find a registered image which is most similar to the query image. As such technique, for example, Japanese Patent Laid-Open Nos. 8-249349, 10-260983, and the like are known.

However, if there are two different types of such image search apparatuses, when they segment a color space into different numbers of cells, or segment an image into different numbers of blocks, their color label strings cannot be commonly used. For this reason, a feature amount must be extracted from an original image.

Also, as the number of blocks obtained by segmenting an image becomes smaller (coarser segmentation), dominant colors (most of them are background colors) of the entire image occupy most labels of a color label string, and the colors of an object which is present in the background are lost. In this case, especially, since the aforementioned image search apparatus can only make a search using the background color, too many search results are output, and the user cannot easily obtain a desired image.

SUMMARY OF THE INVENTION

The present invention has been made in consideration of the aforementioned problems, and has as its first object to provide an image processing apparatus and method, which can convert given color label string data into another color label string data without requiring any original image, and a storage medium.

It is the second object of the present invention to provide an image processing apparatus and method, which can convert given color label string data into another color label string data after the dominant background color of an original image is excluded, and a storage medium.

In order to achieve the above objects, an image processing apparatus according to the first invention comprises the following arrangement.

That is, an image processing apparatus which segments an image into a plurality of blocks, and expresses the image by color label string data by assigning color labels to the segmented blocks in correspondence with feature amounts, comprises:

input means for inputting source color label string data and attribute information thereof;

designation means for designating attribute information of converted color label string data; and conversion means for converting the source color label string data into destination color label string data on the basis of the attribute information input by the input means, and the attribute information designated by the designation means.

Also, an image processing apparatus according to the second invention comprises the following arrangement.

That is, an image processing apparatus which segments an image into a plurality of blocks, and expresses the image by color label string data by assigning color labels to the segmented blocks in correspondence with feature amounts, comprises:

input means for inputting source color label string data and attribute information thereof;

determination means for determining a background color of a source image on the basis of the color label string data input by the input means;

designation means for designating attribute information of converted color label string data; and conversion means for converting the source color label string data into destination color label string data on the basis of the attribute information input by the input means, the attribute information designated by the designation means, and a determination result of the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 shows an example of a color label string format in the first embodiment;

FIG. 9 shows an example of a source block corresponding to a destination block of interest in the first embodiment;

FIG. 10 shows another example of a source block corresponding to a destination block of interest in the first embodiment;

FIG. 13 shows an actual operation sequence and example of color label conversion;

DETAILED DESCRIPTION OF THE PREFERRED EMBODIMENTS

Preferred embodiments of the present invention will be described hereinafter with reference to the accompanying drawings.

<First Embodiment>

Figure 1:
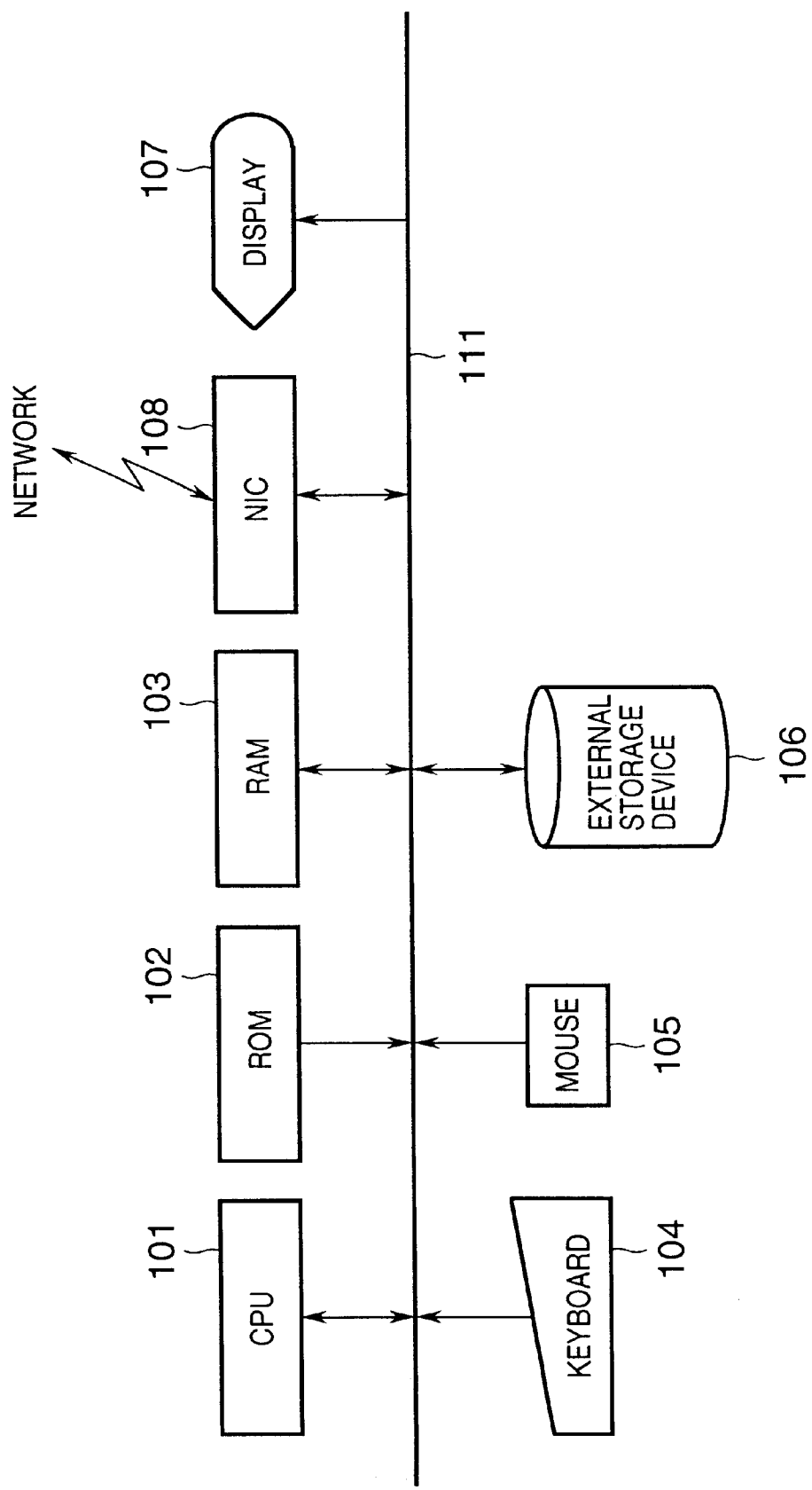
FIG. 1 is a block diagram showing the arrangement of a color label string conversion apparatus according to the first embodiment of the present invention.

FIG. 1 is a block diagram showing the control arrangement of a color label string conversion apparatus of this embodiment. Referring to FIG. 1, reference numeral 101 denotes a CPU for executing various kinds of control in an image search apparatus of this embodiment. Reference numeral 102 denotes a ROM which stores a boot program upon starting up this apparatus, and various data. Reference numeral 103 denotes a RAM which stores a control program to be processed by the CPU 101, and is used as a work area upon executing various kinds of control by the CPU 101. Reference numeral 104 denotes a keyboard; and 105, a mouse. The keyboard 104 and mouse 105 provide various input operation environments for the user.

Reference numeral 106 denotes an external storage device which comprises a hard disk, floppy disk, CD-ROM, or the like. The external storage device 106 stores an OS and various image processing application programs, and when they are loaded onto the RAM 103, the apparatus of this embodiment can serve as a color label string conversion apparatus. Reference numeral 107 denotes a display which comprises a CRT display or the like, and displays results and the like for the user. Reference numeral 108 denotes a network interface which allows communications with other apparatuses on a network. Note that a plurality of apparatuses such as an image search apparatus, image recognition apparatus, and the like are present on the network. Reference numeral 111 denotes a bus for connecting the aforementioned building components.

In the above arrangement, the external storage device 106 may be replaced by the one on the network.

Figure 2:
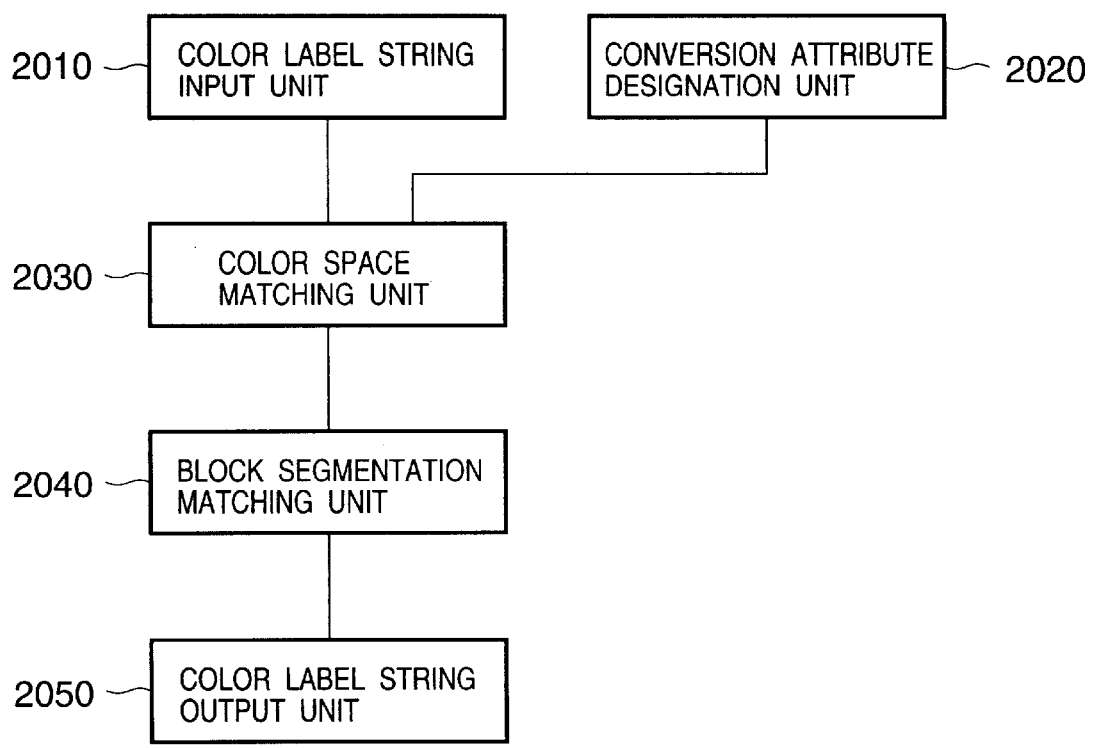
FIG. 2 is a functional block diagram of the color label string conversion apparatus of the first embodiment.

FIG. 2 is a block diagram showing the functional arrangement of the color label string conversion apparatus of this embodiment. Note that building components to be described below are mainly implemented by the CPU 101 in relation to FIG. 1. That is, most of the building components to be described below are implemented by software (its program is stored in the external storage device and is loaded onto the RAM 103 upon execution) executed by the CPU 101.

Referring to FIG. 2, reference numeral 2010 denotes a color label string input unit, which receives a color label string written in a format shown in FIG. 5 (to be described later) from a source image recognition apparatus via the external storage device 106 and the network interface 108. Reference numeral 2020 denotes a conversion attribute designation unit for designating an attribute of a destination of a color label string. Reference numeral 2030 denotes a color space matching unit for matching source and destination color spaces. Reference numeral 2040 denotes a block segmentation matching unit for matching source and destination segmented blocks. Reference numeral 2050 denotes a color label string output unit for outputting a converted color label string to a destination image search apparatus directly or via the external storage device 106 and network interface 108.

An example of the operation of the color label string conversion apparatus of this embodiment with the aforementioned arrangement will be explained below.

Figure 14:
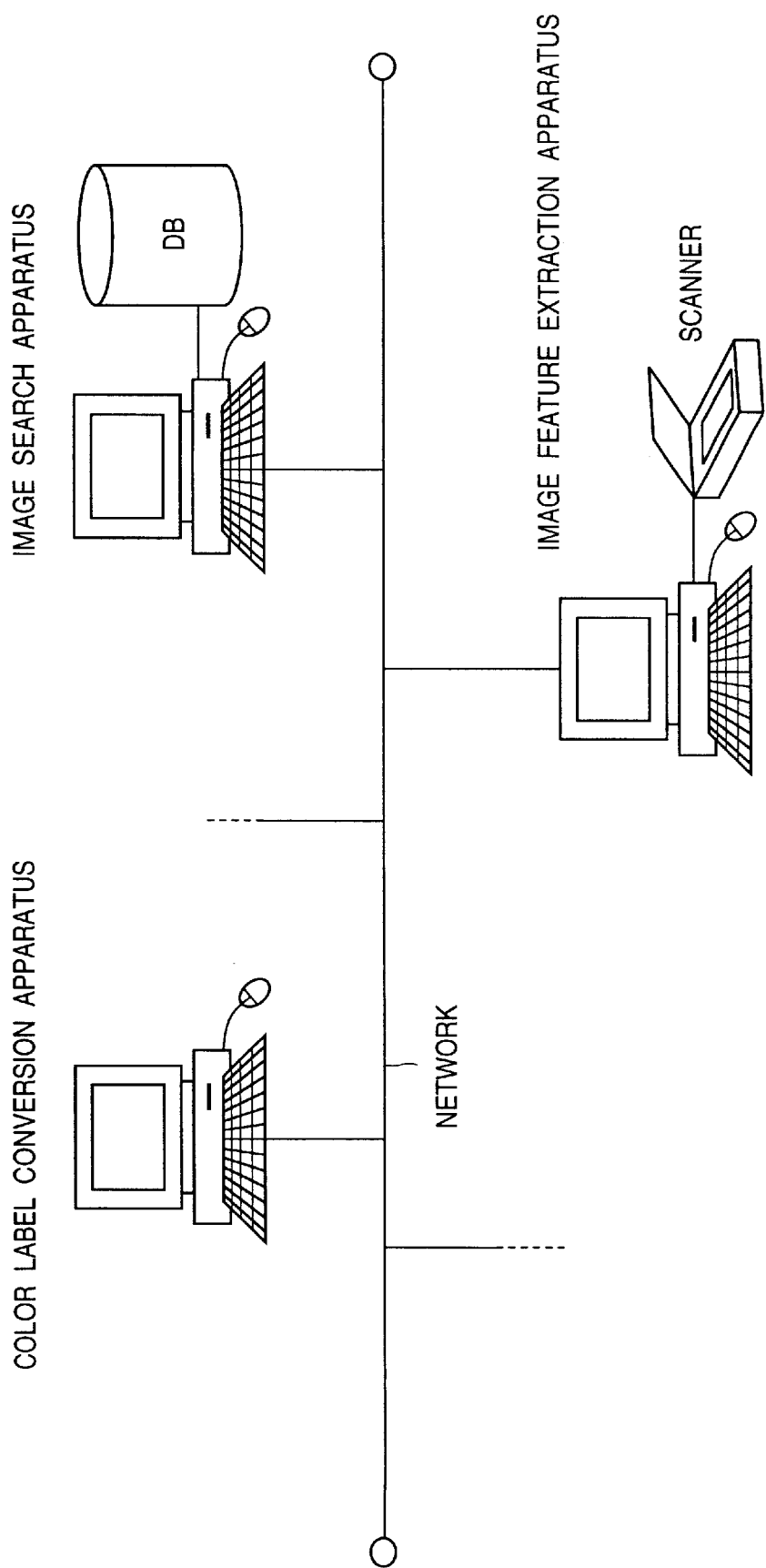
FIG. 14 is a view showing the location of the color label string conversion apparatus of the first embodiment on a network.

The color label string conversion apparatus of this embodiment is located as an apparatus which converts a color label string, which is generated by an image feature extraction apparatus by capturing an image (query image) to be used to find a desired image, and is supplied to an image search apparatus, into that which matches labels of a color space used in that image search apparatus, as shown in, e.g., FIG. 14.

FIG. 5 shows an example of the color label string format according to this embodiment. In this format, a color space stores the name of a color space used in an feature extraction process of an image search apparatus, e.g., the type of color space such as an RGB color space, L*u*v*color space, or the like. The number of segmented color space cells indicates the number of segmented cells to be labeled of that color space.

Figure 6:
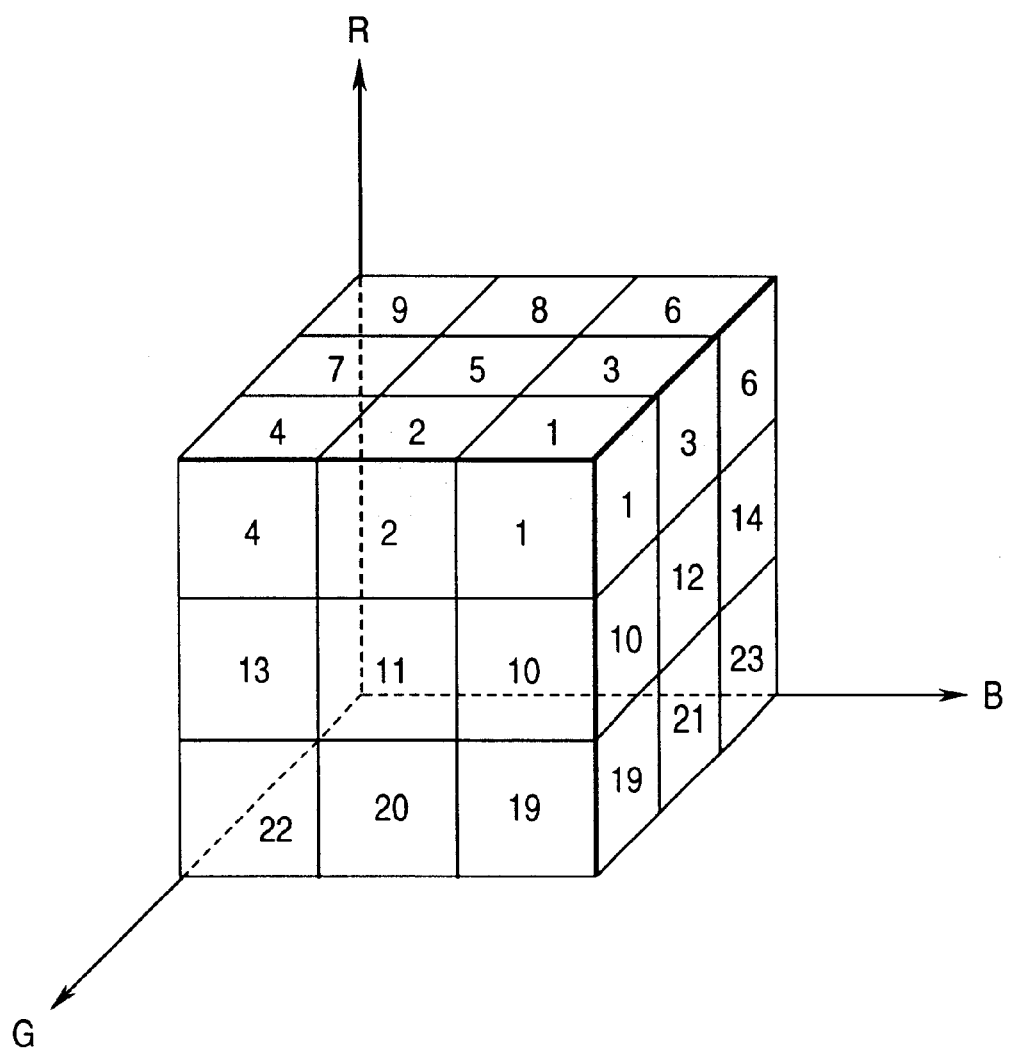
FIG. 6 shows an example of an RGB color space which is segmented into cells and assigned labels.

FIG. 6 shows an example of an RGB space which is segmented into 27 cells (=3×3×3) and is labeled. The number of segmented blocks indicates the numbers of blocks in the horizontal direction (x-direction) and vertical direction (y-direction) of an image. A label string stores an actual color label string itself.

Figure 3:
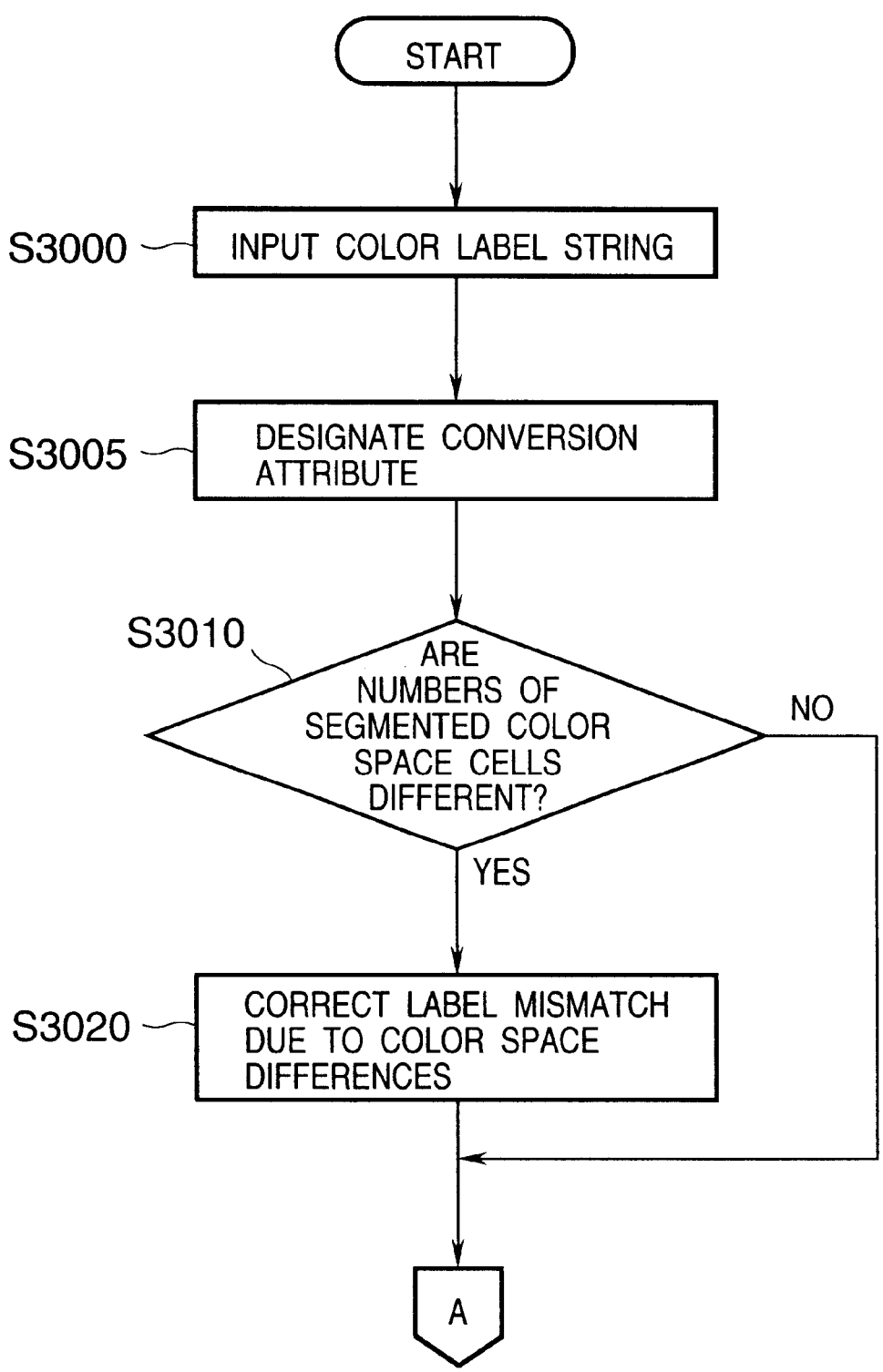
FIG. 3 is a flow chart showing the sequence of a color label conversion process of the first embodiment.
Figure 4:
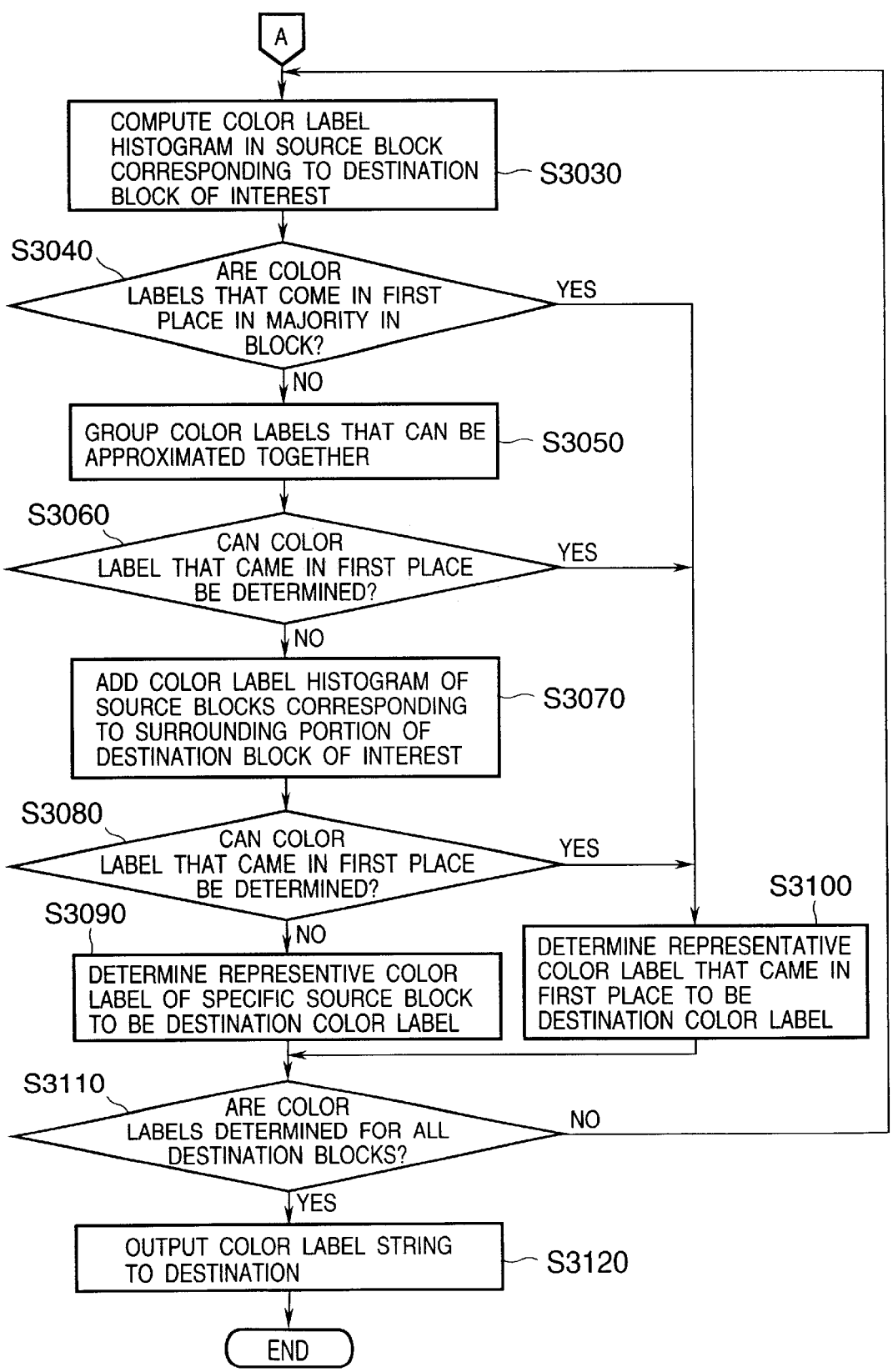
FIG. 4 is a flow chart showing the sequence of the color label conversion process of the first embodiment.

FIGS. 3 and 4 show the sequence of a color label string conversion process of this embodiment, which is executed by the CPU 101. The color label string conversion process will be explained below with reference to FIGS. 3 and 4. Note that attribute information that pertains to source and destination color labels is pre-stored, but may be acquired by, e.g., issuing a request to a destination apparatus via a network.

Figure 7:
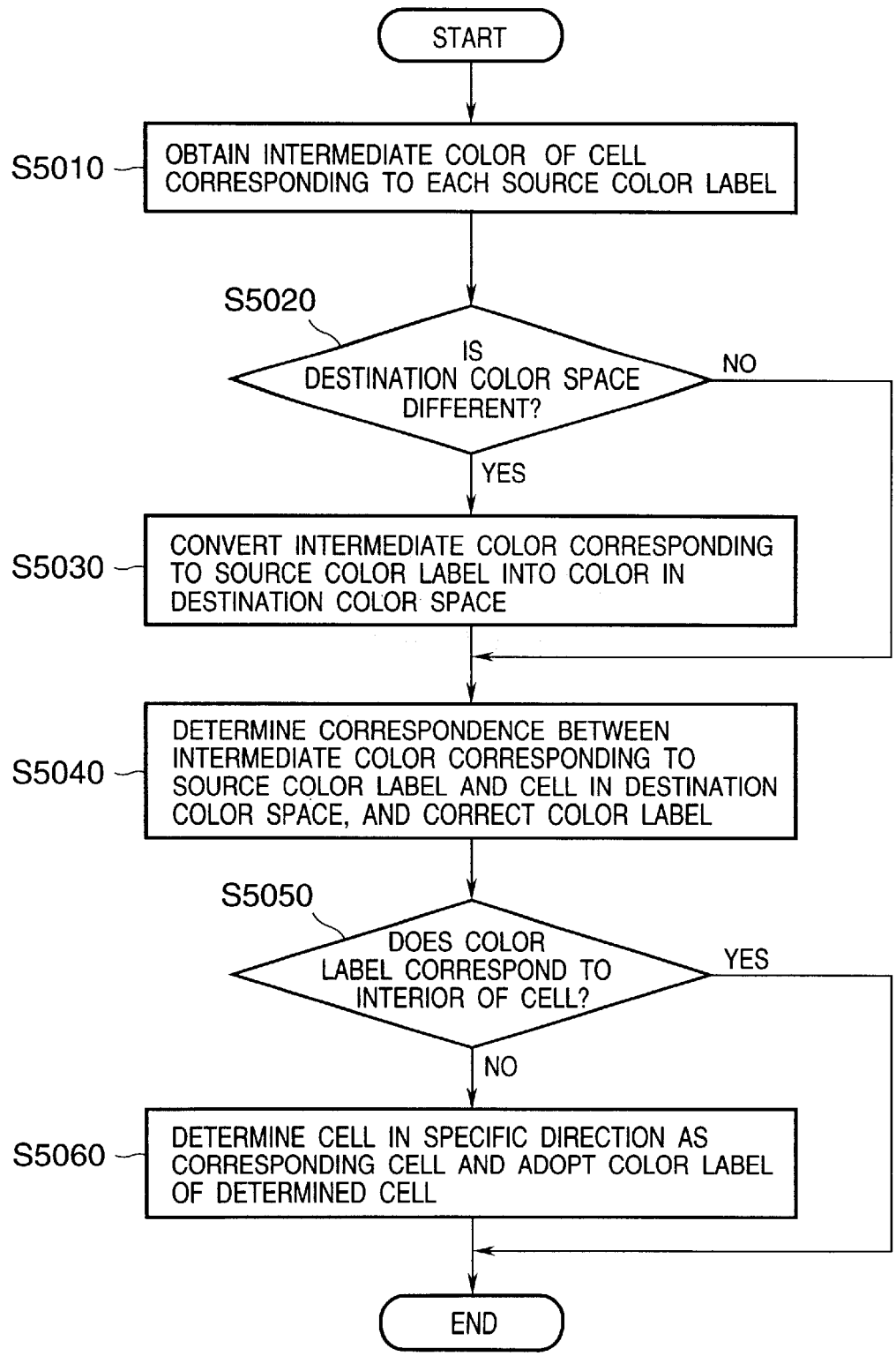
FIG. 7 is a flow chart showing the detailed sequence of a color space matching process.

In step S3000, the color label string input unit 2010 inputs a source color label string. In step S3005, the conversion attribute designation unit 2020 designates attributes of the destination. The attributes to be designated are those (color space, the number of segmented color space cells, and the number of segmented blocks) which pertain to color labels shown in the format in FIG. 5. In step S3010, the color space matching unit 2030 compares the number of segmented color space cells of the source with that of the destination, and the source color space with the destination color space to check if they are different from each other. If the numbers of segmented color space cells or color spaces are different from each other, the color matching unit 2030 corrects color label mismatches due to color space differences in step S3020. This process will be described in detail below using FIG. 7.

In step S5010, an intermediate color of a cell (color at the central position of a cell) corresponding to each label of the source is obtained. In the example shown in FIG. 6, since a cell corresponding to each label is a cube, colors $(R_0, G_0, B_0)$, $(R_1, G_1, B_1)$, $(R_2, G_2, B_2)$, $(R_3, G_3, B_3)$, $(R_4, G_4, B_4)$, $(R_5, G_5, B_5)$ $(R_6, G_6, B_6)$, and $(R_7, G_7, B_7)$ at eight vertices can be averaged in units of cells as per $$R_{mid} = 1/8 \cdot (R_0 + R_1 + R_2 + R_3 + R_4 + R_5 + R_6 + R_7) \quad (1)$$

$$G_{mid} = 1/8 \cdot (G_0 + G_1 + G_2 + G_3 + G_4 + G_5 + G_6 + G_7) \quad (2)$$

$$B_{mid}=1/8 \cdot (B_0+B_1+B_2+B_3+B_4+B_5+B_6+B_7) \quad (3)$$

where mid indicates an intermediate color.

It is checked in step S5020 if the source and destination color spaces are different from each other. If they are different from each other, intermediate colors corresponding to the individual color labels obtained by the above equations are converted into values of the destination color space. For example, if the source color space is an RGB color space and the destination color space is an L*u*v* color space, conversion can be implemented by:

$$X=0.62R+0.17G+0.18B \quad (4)$$

$$Y=0.31R+0.59G+0.11B \quad (5)$$

$$Z=0.066G+1.02B \quad (6)$$

$$u'=4X/(X+15Y+3Z) \quad (7)$$

$$v'=9Y/(X+15Y+3Z) \quad (8)$$

$$L^*=25(100Y)^{1/3}-16 \quad (9)$$

$$u^*=13L^*(u'-0.201) \quad (10)$$

$$v^*=13L^*(v'-0.461) \quad (11)$$

where R, G, and B are respectively $R_{mid}$, $G_{mid}$, and $B_{mid}$ in units of cells computed previously.

In step S5040, the coordinate position of an intermediate color corresponding to each source color label is mapped into the destination color space to determine that cell of the destination color space which includes the mapped coordinate position, i.e., to determine a corresponding color label, thus correcting source color labels. At this time, when both the source and destination color spaces are RGB color spaces, the number of segmented color space cells of the source is 3 (R direction)×3 (G direction)×3 (B direction)=27, and that of the destination is doubled in the respective directions, i.e., 6 (R direction)×6 (G direction)×6 (B direction)=216, the source intermediate color corresponds to a vertex of a given destination cubic cell, and no color label can be determined. In step S5050, this discrimination is made, and if no corresponding color label can be determined, a cell in a specific direction is determined to be a corresponding cell, and the color label of that cell is adopted in step S5060. For example, of cells near the position of the intermediate color, a cell close to black (R=0, G=0, B=0) may always be selected. Details of the process for correcting label mismatches due to color space differences have been explained.

Figure 8:
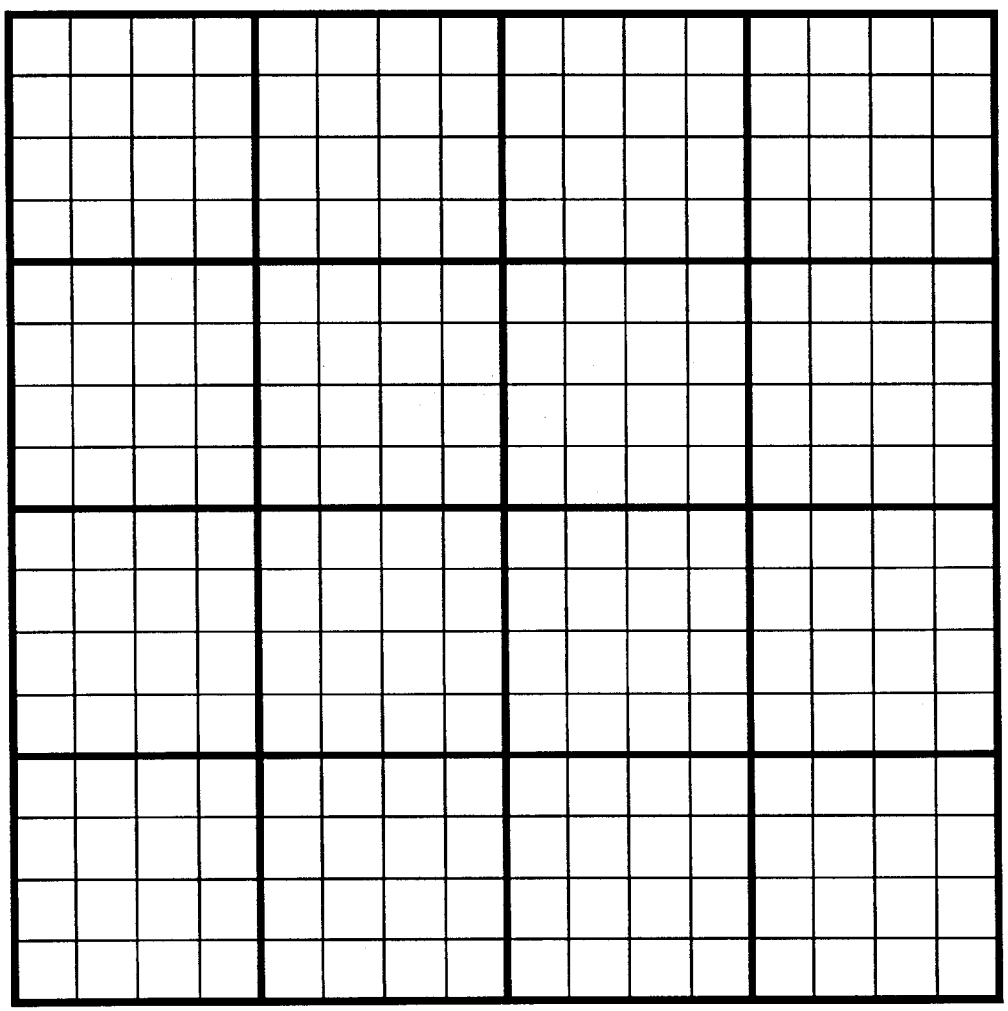
FIG. 8 shows an example of an image segmented into blocks in the first embodiment.

The process in the block segmentation matching unit 2040 will be described below. For the sake of simplicity, a case will be exemplified below wherein the number of segmented blocks of an image of the source is 16 (x-direction)×16 (y-direction) (segmented blocks indicated by thin lines), and the number of blocks of an image of the destination is 4 (x-direction)×4 (y-direction) (segmented blocks indicated by bold lines), as shown in FIG. 8. That is, in this case, blocks of the source are grouped together in units of 4 (x-direction)×4 (y-direction) blocks in the destination.

Figure 9:
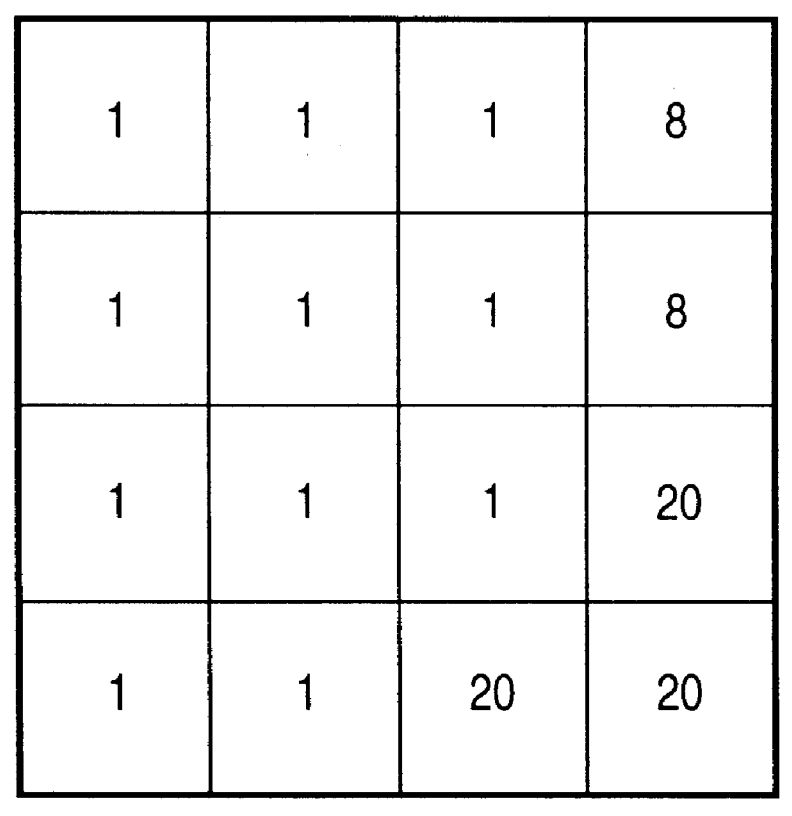
Figure 10:
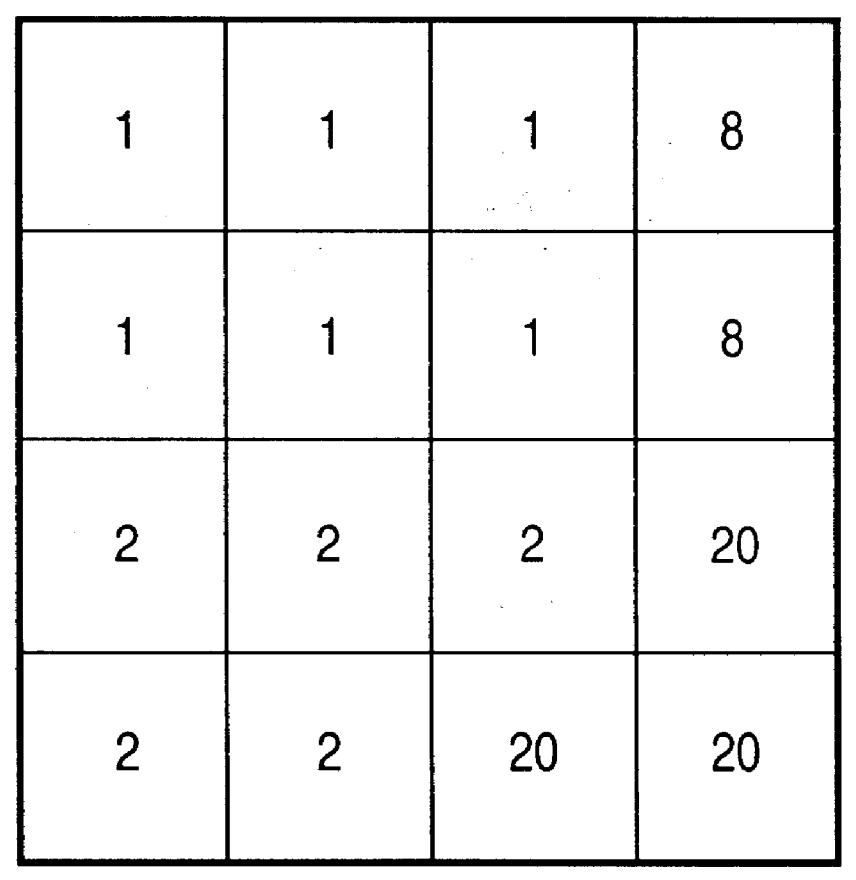

In step S3030, the histogram of color labels of 4×4 source blocks corresponding to each destination block is computed. For example, if color labels of source blocks in the destination block of interest are as shown in FIG. 9, and the histogram of these blocks is computed, 11 color labels "1", three color labels "20", and two color labels "8" are obtained. It is then checked in step S3040 if color labels which come in the first place of that color label histogram are in the majority. In the above example, since the color labels that come in the first place are color labels "1", the number of which is 11, they are in the majority. At this time, the color label that came in the first place is determined to be a destination color label in step S3100. On the other hand, if color labels of source blocks in the destination block of interest are as shown in FIG. 10, the color label histogram includes six color labels "1", five color labels "2", three color labels "20", and two color labels "8". At this time, since the number of color labels "1" that come in the first place is 6, and these labels are not in the majority, labels which can be approximated are grouped together in step S3050. In this process, colors which are assigned different color labels due to the presence of continuous tone in an original image are determined to be an identical color by approximation.

As a method of determining color labels to be an identical color by approximation, a method of grouping neighboring cells together in the color space, a method of manually determining combinations of color labels that can be approximated, and preparing a table of color labels that can be approximated, and the like may be used. In this embodiment, the former method will be exemplified.

In FIG. 10, since color labels "1" and "2" belong to neighboring cells (having close color relationship) in the color space, as shown in FIG. 6, they are grouped together. At this time, color labels with the lower frequency of occurrence are thrown together into those with the higher frequency of occurrence. That is, color labels are grouped together to obtain 11 color labels "1" (=the number of color labels "1"+the number of color labels "2"). (If the two color labels have the same frequency of occurrence, they may be thrown together into specific ones such as color labels having a smaller serial number.)

In this manner, it is checked for all the color labels if they can be approximated, and if color labels can be approximated, a process for grouping color labels together with those having higher frequency of occurrence is done. With this process, the color label histogram in the example of FIG. 10 includes 11 color labels "1", three color labels "20", and two color labels "8".

Figure 11B:
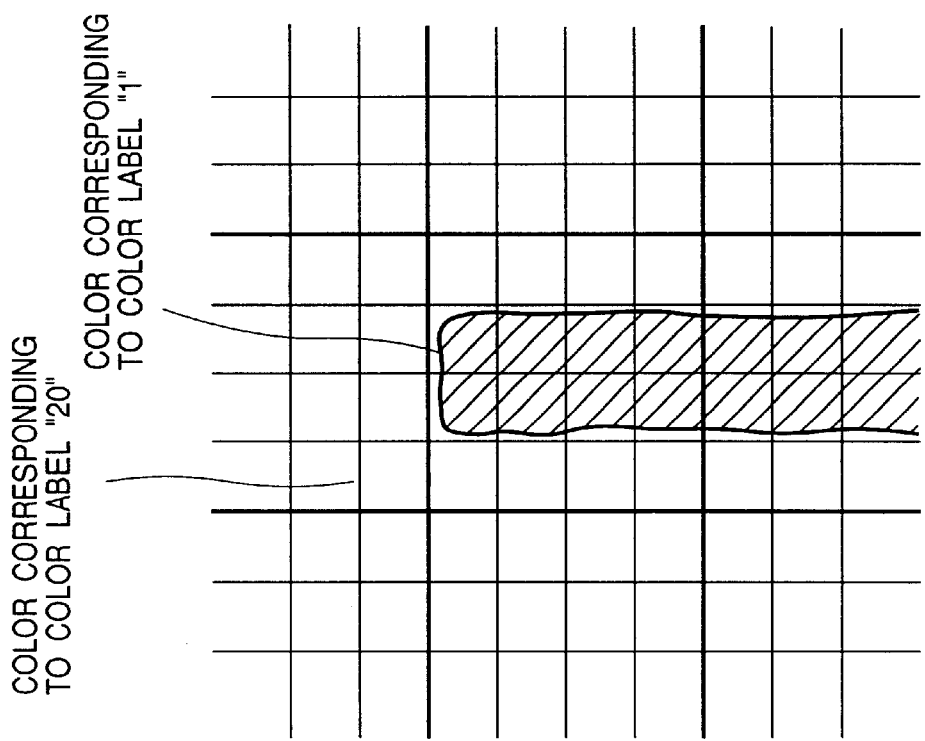
FIGS. 11A and 11B show an example when the color label of a destination block is determined by referring to surrounding blocks in the first embodiment.

It is checked in step S3060 if the color label that came in the first place can be determined. In the example in FIG. 10, since 11 color labels "1" are obtained by grouping, the color label that came in the first place can be determined in this case, and color label "1" is determined to be a destination color label in step S3100. When the blocks of interest are central ones bounded by the bold line, as shown in an example in FIG. 11A, and the corresponding original image is as shown in FIG. 11B, even when a color label histogram is computed, since the number of color labels "1" is 8 and that of color labels "20" is 8, the color label that came in the first place cannot be determined in step S3060.

For this reason, in step S3070 color labels of blocks around the blocks of interest are added to the color label histogram. This process determines a dominant color label from surrounding color labels. In the example shown in FIG. 11A, color label "20" is dominant, as can also be seen from FIG. 11B that shows the corresponding original image.

In consideration of two more surrounding source blocks corresponding to the destination block of interest (a region bounded by the bold dotted line in FIG. 11A), the color label histogram includes 52 color labels "20", and 12 color labels "1". It is checked in step S3080 if color labels that come in the first place can be determined. In the example shown in FIG. 11A, since the number of color labels "20" is 52 and these labels win the first place, color label "20" is determined to be a destination color label in step S3100. If color labels that come in the first place cannot be determined in step S3080, i.e., if it cannot be determined even after processes in steps S3030 to S3080, for example, when the blocks of interest are central ones bounded by the bold line in FIG. 12A, and the corresponding original image is as shown in FIG. 12B, a specific source block is determined to be a destination color block in step S3090. As a specific block, a method of adopting a block at a specific position (e.g., an upper left position) of the blocks of interest may be used. If the destination block of interest is located at the end of an image in step S3070, no surrounding source blocks are present outside the image region. At this time, when an unused color label (e.g., 0) is assigned to such surrounding blocks which are not present upon counting, such blocks do not influence the conversion result. That is, if label 0 is found in image search, it does not indicate any color, and can be ignored upon pattern matching, in other words, it is processed as a wildcard.

It is checked in step S3110 if color labels are determined for all destination blocks. If blocks for which color labels are to be determined still remain, the processes in steps S3040 to S3090 and S3100 are repeated. If color labels are determined for all the blocks, the color label string output unit 2050 outputs a color label string to the destination in step S3120.

A conversion example will be explained in more detail using FIG. 13. For the sake of simplicity, assume that both the source and destination color spaces are RGB color spaces.

An original image 131 is segmented into 4 (vertical)×4 (horizontal) (a total of 16 blocks). On the other hand, a color space 132 is segmented into 8 cells (=2×2×2), color labels 1 to 8 are defined, and any of labels 1 to 8 are assigned to the individual blocks of the original image.

On the other hand, a plurality of images are registered in an image search apparatus (database). When each registered image is segmented into 2×2 blocks, each block is assigned one of color labels which are assigned to 64-segmented (=4×4×4) color space cells, as shown in a color space 134 in FIG. 13, and that color label is stored and managed as an index.

As shown in FIG. 13, a source label string consists of 16 color labels, and does not match that in the image search apparatus upon requesting a search. In this embodiment, as shown in FIG. 13, a given (input) label string (not original image data) is converted into four labels (=a label string) on the basis of attribute information (color space name, the number of segmented color space cells, the number of segmented blocks of an image) that pertains to source color labels, and attribute information that pertains to destination labels. As a result, the image search apparatus can make an image search using a known method such as pattern matching or the like in accordance with the label string obtained by conversion. Note that the number of segmented blocks of an actual image is much larger than 4×4 or 2×2, as shown in FIG. 13.

In the above description, both the source and destination color spaces are RGB. As color spaces, various colorimetric spaces such as L*u*v*, L*a*b*, YMC, and the like are present, as described above. This embodiment can be applied to any of these color spaces. Especially, a color space defined by luminance, hue, and saturation does not have any cubic shape unlike an RGB color space, but has a distorted spherical shape. In such non-cubic color space, an inscribed cube may be assumed, and color labels may be defined by segmenting that cube. At this time, although a certain space between the sphere and cube remains uncovered, such space can be defined as an unused region, and no serious problem is posed.

When labels are defined by segmenting a color space, a small space segment that defines each label is a cube in this embodiment, and the color space is uniformly segmented in three axes. This is because small space segments, i.e., labeling rules can be uniquely defined by determining only the number of segments, and attribute information can be simple. When each small space segment is not a cube and the numbers of segments in the three axes are different from each other, labeling rule information including such information may be included in attribute information.

As described above, even when image processing apparatuses (e.g., image search apparatuses), each of which segments an image into a plurality of blocks and expresses each block using a color label corresponding to its feature amount, have different color spaces or different numbers of segmented blocks of an image used in feature amount extraction, since color label conversion can be implemented with high precision, an original image need not be registered again.

In this embodiment, color label conversion has been mainly explained. However, since such function may be built in an image search apparatus, the present invention is not limited by the above embodiment.

When there are a large number of destination and source apparatuses, the apparatus of this embodiment may store and manage information (color space name, the number of segmented cells, and labeling rule information) that pertains to color labels managed by each of these apparatuses, and may be located as the core on the network.

In this embodiment, the format of the color label string includes the color space name, the number of segmented color space cells, and the number of segmented blocks as attributes, as shown in FIG. 5. Also, for example, the number of segmented color space cells may be designated by the numbers of segmented cells in R, G, and B directions in case of an RGB space in place of the total number of cells. In this manner, more precise attributes, and other attributes such as an attribute pertaining to a color palette and the like may be added.

In this embodiment, upon grouping color labels that can be approximated together in step S3050, a color label with higher frequency of occurrence is used. Alternatively, an average color of intermediate colors of color labels that can be approximated may be computed by weighting them with the frequencies of occurrence of these color labels (if the frequency of occurrence of color label "1" is 3, that of color label "2" is 2, and these color labels can be approximated, the average color can be computed by $R_{mid}=1/5(3R_1+2R_2)$, $G_{mid}=1/5(3G_1+2G_2)$, and $B_{mid}=1/5(3B_1+2B_2)$), and the color label of a cell to which that average color belongs may be used.

In this embodiment, an application example in the image search apparatus has been explained. However, the application method is not particularly limited as long as an image processing apparatus segments an image into a plurality of blocks, and expresses color of each block by a label in correspondence with its feature amount.

Note that the present invention may be applied to either a system constituted by a plurality of devices such as a host computer, an interface device, a reader, a printer, and the like, or an apparatus consisting of a single equipment (e.g., a copying machine, a facsimile apparatus, or the like).

As described above, according to this embodiment, even when image processing apparatuses (e.g., image search apparatuses), each of which segments an image into a plurality of blocks and expresses each block using a color label corresponding to its feature amount, have different numbers of segmented color space cells or different number of blocks of an image used in feature amount extraction, color label strings can be commonly used, and an original image need not be registered again.

<Second Embodiment>

The second embodiment of the present invention will be described below.

Assuming that the apparatus arrangement is the same as that shown in FIG. 1 of the above embodiment (first embodiment), a detailed description thereof will be omitted, and only differences will be explained below.

Figure 15:
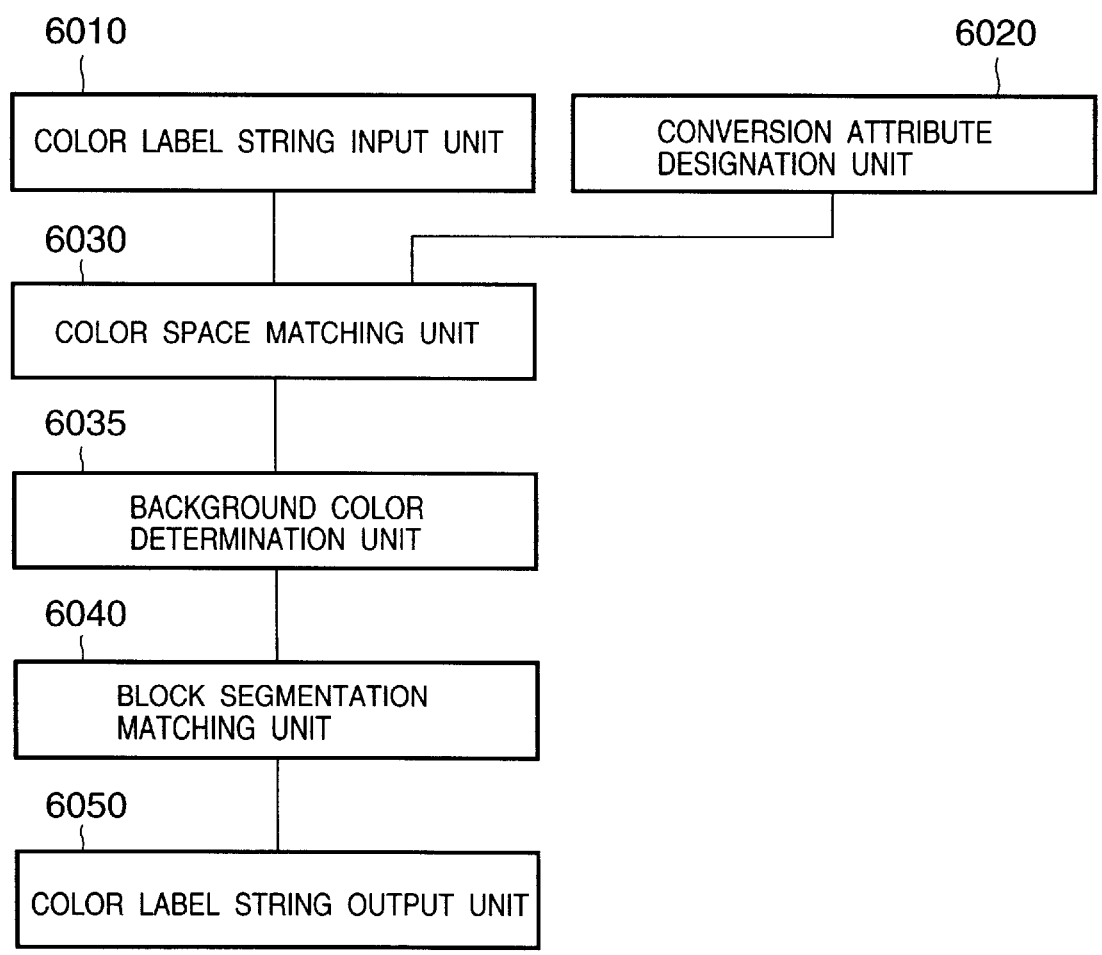
FIG. 15 is a functional block diagram of a color label string conversion apparatus according to the second embodiment of the present invention.

FIG. 15 is a block diagram showing the functional arrangement of the color label string conversion apparatus of the second embodiment. Note that building components to be described below are mainly implemented by the CPU 101 in relation to FIG. 1. That is, most of the building components to be described below are implemented by software (its program is stored in the external storage device and is loaded onto the RAM 103 upon execution) executed by the CPU 101.

Referring to FIG. 15, reference numeral 6010 denotes a color label string input unit, which receives a color label string written in a format shown in FIG. 5 (to be described later) from a source image recognition apparatus via the external storage device 106 and the network interface 108. Reference numeral 6020 denotes a conversion attribute designation unit for designating an attribute of a destination of a color label string. Reference numeral 6030 denotes a color space matching unit for matching source and destination color spaces. Reference numeral 6035 denotes a background color determination unit for determining a color label to which dominant color (background color) in an image belongs. Reference numeral 6040 denotes a block segmentation matching unit for matching source and destination segmented blocks. Reference numeral 6050 denotes a color label string output unit for outputting a converted color label string to a destination image search apparatus directly or via the external storage device 106 and network interface 108.

An example of operation of the color label string conversion apparatus of the second embodiment having this arrangement will be described below.

The color label string conversion apparatus of the second embodiment is an apparatus which converts a color label string, which is generated by an image feature extraction apparatus by capturing an image (query image) to be used to find a desired image, and is supplied to an image search apparatus, into that which matches labels of a color space used in that image search apparatus, as in the first embodiment.

Figure 16:
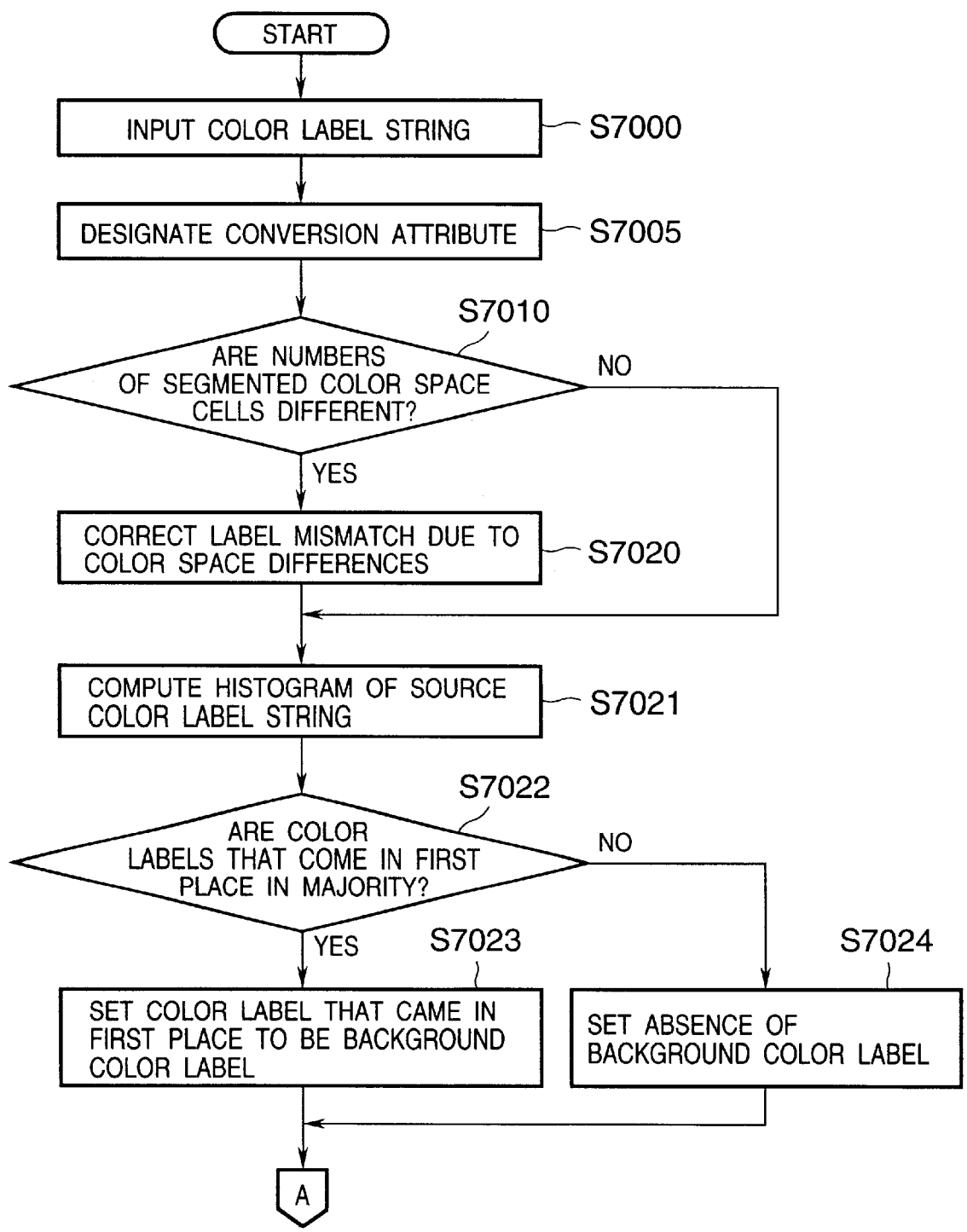
FIG. 16 is a flow chart showing the sequence of a color label conversion process of the second embodiment.
Figure 17:
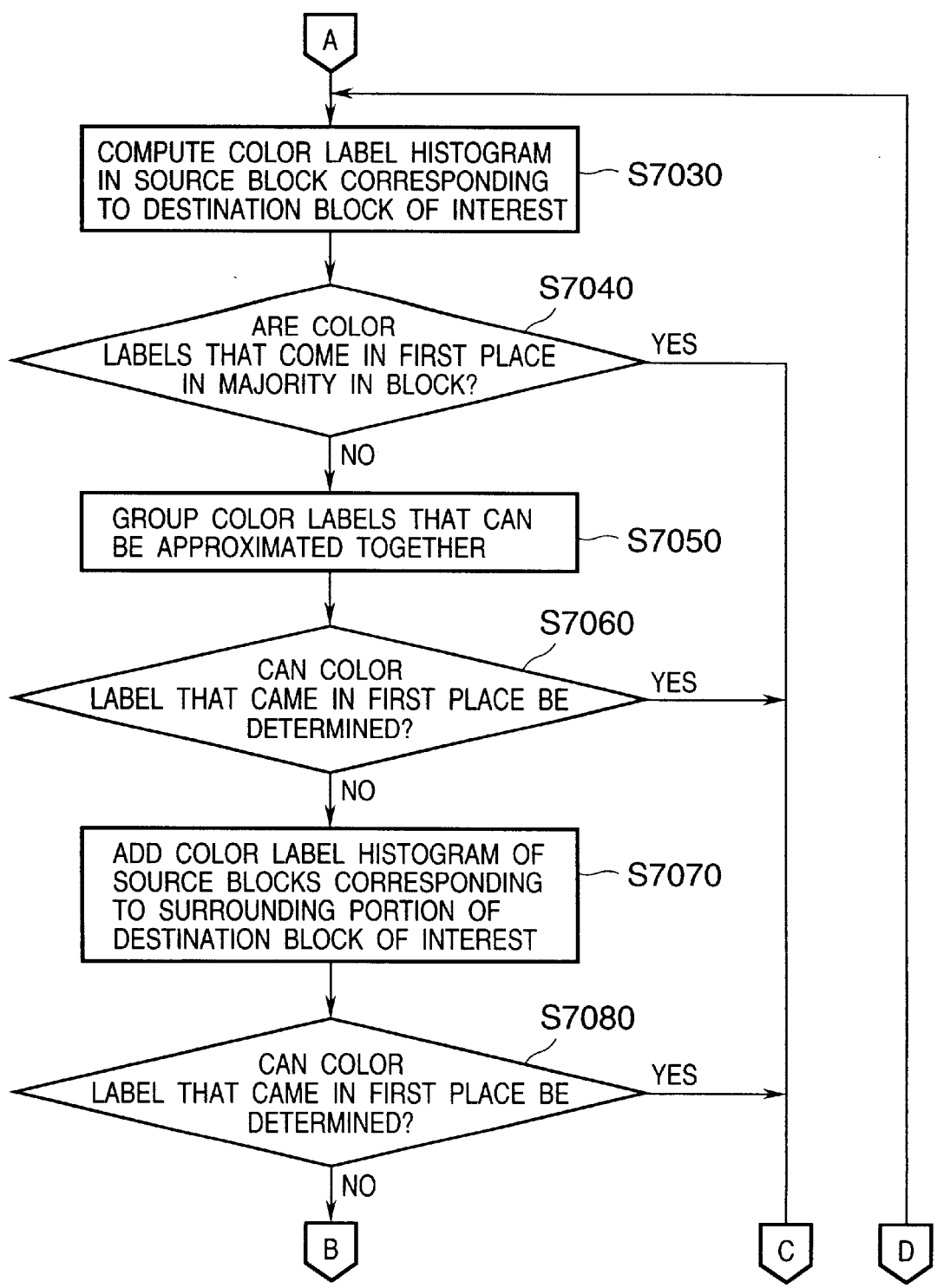
FIG. 17 is a flow chart showing the sequence of the color label conversion process of the second embodiment.
Figure 18:
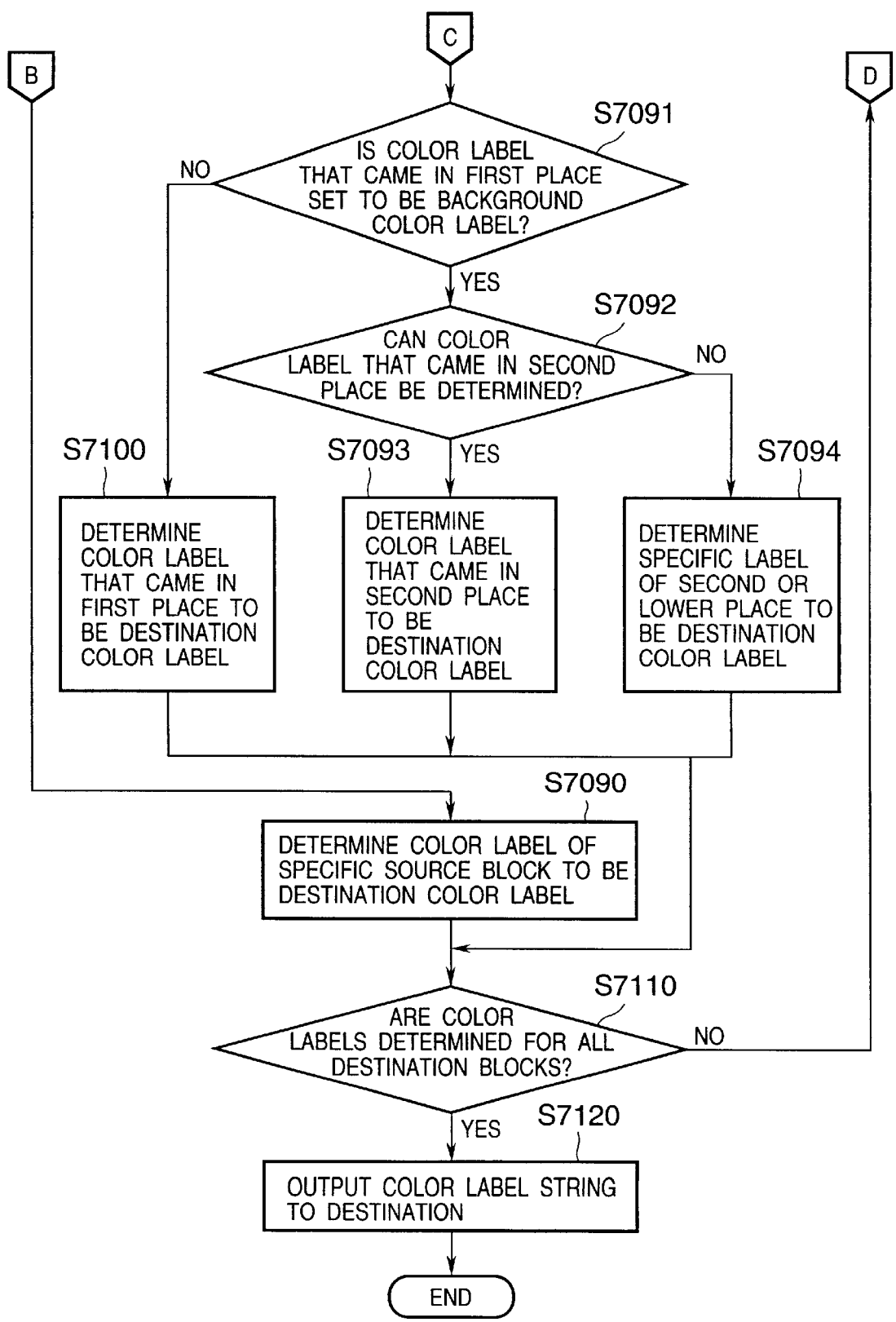
FIG. 18 is a flow chart showing the sequence of the color label conversion process of the second embodiment.

FIGS. 16 to 18 show the sequence of a color label string conversion process according to the second embodiment, which is executed by the CPU 101. The color label string conversion process will be explained below with reference to FIGS. 16 to 18. Note that attribute information that pertains to source and destination color labels is pre-stored, but may be acquired by, e.g., issuing a request to a destination apparatus via a network.

In step S7000, the color label string input unit 6010 inputs a source color label string. In step S7005, the conversion attribute designation unit 6020 designates attributes of the destination. The attributes to be designated are those (color space, the number of segmented color space cells, and the number of segmented blocks) which pertain to color labels shown in the format in FIG. 5. In step S7010, the color space matching unit 6030 compares the number of segmented color space cells of the source with that of the destination, and the source color space with the destination color space to check if they are different from each other. If the numbers of segmented color space cells or color spaces are different from each other, the color matching unit 6030 corrects color label mismatches due to color space differences in step S7020. This process is the same as that in the first embodiment (FIG. 7), and a detailed description thereof will be omitted.

The process of the background color determination unit 6035 will be explained below.

In step S7021 in FIG. 16, the histogram of the source color label string is computed. It is then checked in step S7022 if color labels that come in the first place (occur most frequently) are in the majority. If the color labels that come in the first place are in the majority, it is determined that the color indicated by that label is dominant color over the entire image, and the color label that came in the first place is set and registered as a background color label in step S7023. Assume that the background color label is registered at, e.g., a predetermined address of the RAM 103. On the other hand, if the labels that come in the first place are not in the majority, that label is not set as the background color label. In this case, label 0 is registered at that address position as a default value. That is, if "0" is stored at this address position in a process later, it is determined that no background color is registered; if a value other than "0" is registered, it is determined that a label corresponding to that value is a background color.

Since the block segmentation matching unit 6040 is the same as the block segmentation matching unit 2040 in the first embodiment, a description thereof will be omitted.

In step S7030, the histogram of color labels of 4×4 source blocks corresponding to each destination block is computed. For example, if color labels of source blocks in the destination block of interest are as shown in FIG. 9, and the histogram of these blocks is computed, 11 color labels "1", three color labels "20", and two color labels "8" are obtained. It is then checked in step S7040 if color labels which come in the first place of that color label histogram are in the majority. In the above example, since the color labels that come in the first place are color labels "1", the number of which is 11, they are in the majority. At this time, it is checked in step S7091 if the color label that came in the first place is the background color label. Whether or not the color label that came in the first place is the background color label can be determined by comparing it with the aforementioned registered value.

If the color labels that come in the first place are in the majority and do not indicate any background color, the flow advances to step S7100, and the color label that came in the first place is directly used as a destination color label. For example, in the state shown in FIG. 9, if color labels "1" win the first place and are in the majority, and the registered background color is other than color label "1", the color label that came in the first place is converted into a color label according to the attributes of the destination color space.

On the other hand, if the color label that came in the first place is the background color (the color label that came in the first place matches a color label registered as the background color), the flow advances to step S7092 to check if the color labels that come in the second place can be determined as a destination label. For example, if color label "1" is registered as the background color in the state shown in FIG. 9, color labels "20" win the second place (the second highest frequency of occurrence), and there are no other labels having the same frequency of occurrence). In such case, the flow advances to step S7093, and the color label that came in the second place is used as a color label according to the attributes of the destination color space.

If there are a plurality of different color labels having the second or lower highest frequency of occurrence, a specific one of those color labels is selected in step S7094. As the specific color label, the color label with the smallest serial number may be selected from those having the second or lower highest frequency of occurrence. If three or more color labels that come in the second place are present, those having the closest distance may be grouped together, and may be selected based on their total number.

In any case, if one color label is determined, the flow advances to step S7110 to check if color labels are determined for all destination blocks. If NO in step S7110, the flow returns to step S7030.

On the other hand, if the color labels that come in the first place in the block of interest are not in the majority, the flow advances from step S7040 to step S7050.

For example, if the block of interest has a state shown in FIG. 10, since the color label histogram includes six color labels "1", five color labels "2", three color labels "20", and two color labels "8", color labels "1" that come in the first place are not in the majority.

In this case, a process for grouping labels that can be approximated together is done in step S7050. In this process, colors which are assigned different color labels due to the presence of continuous tone in an original image are determined to be an identical color by approximation. As a method of determining color labels to be an identical color by approximation, a method of grouping neighboring cells together in the color space, a method of manually determining combinations of color labels that can be approximated, and preparing a table of color labels that can be approximated, and the like may be used. In this embodiment, the former method will be exemplified. In FIG. 10, since color labels "1" and "2" belong to neighboring cells (having close color relationship) in the color space, as shown in FIG. 6, they are grouped together. At this time, color labels with the lower frequency of occurrence are thrown together into those with the higher frequency of occurrence. That is, color labels are grouped together to obtain 11 color labels "1" (if the two color labels have the same frequency of occurrence, they may be thrown together into specific ones such as color labels having a smaller serial number). In this manner, it is checked for all the color labels if they can be approximated, and if color labels can be approximated, a process for grouping color labels together with those having higher frequency of occurrence is done.

With this process, the color label histogram in the example of FIG. 10 includes 11 color labels "1", three color labels "20", and two color labels "8". It is checked in step S7060 if the color label that came in the first place can be determined. In the example in FIG. 10, 11 color labels "1" are obtained by grouping and win the first place. Then, the aforementioned processes in steps S7091, S7092, S7093, S7094, and S7100 are done to determine a destination color label in consideration of the background color label.

Figure 11A:
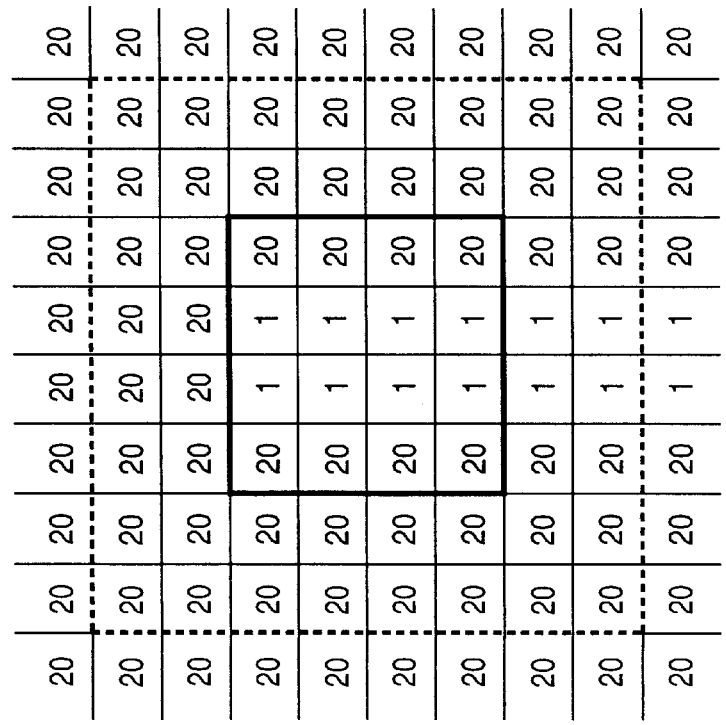
Figures 12A, 12B:
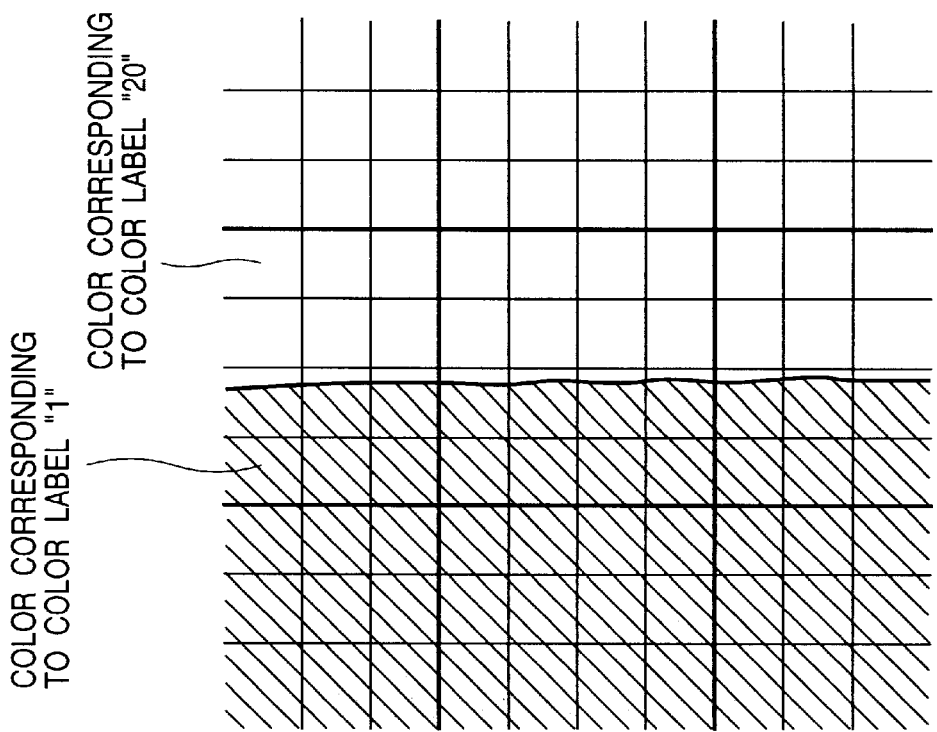
FIGS. 12A and 12B show an example when the color label of a destination block cannot be determined even by referring to surrounding blocks in the first embodiment.

When the blocks of interest are central ones bounded by the bold line, as shown in an example in FIG. 11A, and the corresponding original image is as shown in FIG. 11B, even when a color label histogram is computed, since the number of color labels "1" is 8 and that of color labels "20" is 8, the color label that came in the first place cannot be determined in step S7060.

For this reason, in step S7070 color labels of blocks around the blocks of interest are added to the color label histogram. This process determines a dominant color label from surrounding color labels. In the example shown in FIG. 11A, color label "20" is dominant, as can also be seen from FIG. 11B that shows the corresponding original image. In consideration of two more surrounding source blocks corresponding to the destination block of interest (a region bounded by the bold dotted line in FIG. 11A), the color label histogram includes 52 color labels "20", and 12 color labels "1". It is checked in step S7080 if color labels that come in the first place can be determined. In the example shown in FIG. 11A, the number of color labels "20" is 52 and these color labels win the first place. Then, the aforementioned processes in steps S7091, S7092, S7093, S7094, and S7100 are done to determine a destination color label in consideration of the background color label.

If color labels that come in the first place cannot be determined in step S7080, i.e., if it cannot be determined even after processes in steps S7030 to S7080, the following process is done.

For example, in case of FIG. 12A (the blocks of interest are central ones bounded by the bold line in FIG. 12A, and the corresponding original image is as shown in FIG. 12B), a specific source block is determined to be a destination color block in step S7090. As a specific block, a method of adopting a block at a specific position (e.g., an upper left position) of the blocks of interest may be used. If the destination block of interest is located at the end of an image in step S7070, no surrounding source blocks are present outside the image region. At this time, when an unused color label (e.g., 0) is assigned to such surrounding blocks which are not present upon counting, such blocks do not influence the conversion result.

The aforementioned process is repeated until it is determined in step S7110 that color labels are determined for all destination blocks. Upon completion of the process for all the blocks, the color label string output unit 6050 outputs a color label string to the destination in step S7120.

In this embodiment, the format of the color label string includes the color space name, the number of segmented color space cells, and the number of segmented blocks as attributes, as shown in FIG. 5. Also, for example, the number of segmented color space cells may be designated by the numbers of segmented cells in R, G, and B directions in case of an RGB space in place of the total number of cells. In this manner, more precise attributes, and other attributes such as an attribute pertaining to a color palette and the like may be added.

In the second embodiment, upon grouping color labels that can be approximated together in step S7050, a color label with higher frequency of occurrence is used. Alternatively, an average color of intermediate colors of color labels that can be approximated may be computed by weighting them with the frequencies of occurrence of these color labels (if the frequency of occurrence of color label "1" is 3, that of color label "2" is 2, and these color labels can be approximated, the average color can be computed by $R_{mid}=1/5(3R_1+2R_2)$, $G_{mid}=1/5(3G_1+2G_2)$, and $B_{mid}=1/5(3B_1+2B_2)$), and a color label of a cell to which that average color belongs may be used.

Furthermore, in this embodiment a histogram is computed for the entire source color label string in step S7021. That is, a dominant color label in the entire image is extracted. However, a dominant color label can be extracted from the source color label string over a sufficiently broad range having the destination block of interest as the center. At this time, a dominant color label can be determined for each destination block of interest.

In the second embodiment, an application example in the image search apparatus has been explained. However, the application method is not particularly limited as long as an image processing apparatus segments an image into a plurality of blocks, and expresses color of each block by a label in correspondence with its feature amount.

In the second embodiment, a color label string extracted by another image processing apparatus is commonly used. Alternatively, in a single image processing apparatus, a color label string may be obtained in advance based on a larger number of segmented blocks than a predetermined number of segmented blocks, and may be converted into the one based on the predetermined number of segmented blocks.

Note that the present invention may be applied to either a system constituted by a plurality of devices such as a host computer, an interface device, a reader, a printer, and the like, or an apparatus consisting of a single equipment (e.g., a copying machine, a facsimile apparatus, or the like).

The objects of the present invention are also achieved by supplying a storage medium, which records a program code of a software program that can implement the functions (processes corresponding to FIGS. 3 to 5 and 7, or FIGS. 16 to 18) of the above-mentioned first and second embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the second embodiment, when an image similar to an image scanned by an image reader is to be found by search, even when attribute information (color space name, the number of segmented color space cells, the number of segmented blocks of an image) upon labeling an image of the source is different from that of a destination (a search apparatus having an image database), a destination color label can be directly obtained by converting the source color label without being generated based on an original image, thus allowing an image search. In addition, since the background color of an image can be excluded upon image search although it is important for that image, a search can be made based only on the feature portion of the image, thus efficiently narrowing down to relevant search results.

As described above, according to the present invention, given color label string data can be converted into another color label string data without requiring any original image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which segments an image into a plurality of blocks, and expresses the image by color label string data by assigning color labels to the segmented blocks in correspondence with feature amounts, comprising:

input means for inputting source color label string data and attribute information thereof;

designation means for designating attribute information of converted color label string data;

determination means for determining whether or not the attribute information of the source color label string data is the same as the attribute information of the converted color label string data designated by said designation means; and conversion means for, if said determination means determines that the attribute information of the source color label string data is not the same as the attribute information of the converted color label string data, converting the source color label string data into destination color label string data on the basis of the attribute information input by said input means, and the attribute information designated by said designation means.

2. The apparatus according to claim 1, wherein the attribute information includes a type of color space, the number of labels corresponding to the number of small color space segments that form a color space, and the number of segmented blocks of an image.

3. The apparatus according to claim 1, wherein said conversion means comprises:

means for obtaining an intermediate color of each color label in a source color space; and means for obtaining a destination color label by mapping the obtained intermediate color into a destination color space.

4. The apparatus according to claim 1, wherein when a first block size defined by the number of segmented blocks of the source image is a fraction of a second block size defined by the number of segmented blocks of the destination image, a histogram of labels of blocks having the first block size included in a block having the second block size is computed, a label with the highest frequency of occurrence is determined to be a representative label, and a destination label is assigned based on the representative label.

5. The apparatus according to claim 4, wherein the representative label is determined under a condition that identical labels are in the majority of the number of blocks having the first block size included in the block having the second block size.

6. The apparatus according to claim 4, wherein when the label having the highest frequency of occurrence cannot be specified, color labels assigned at approximate positions in terms of a color space are determined to be identical labels.

7. The apparatus according to claim 4, wherein the representative label for assigning to the destination label is computed by weighting as color labels with the frequencies of occurrence of the color labels.

8. The apparatus according to claim 6, wherein the approximate positions in terms of the color space have a shortest distance in the color space.

9. The apparatus according to claim 6, wherein when the color labels which are determined to be identical color labels are not in the majority, a representative label is determined by labels assigned to blocks within a predetermined range larger than the block of interest having the second block size.

10. The apparatus according to claim 9, wherein when the representative label cannot be determined by the labels assigned to blocks within a predetermined range larger than the block having the second block size, a label of a block located at a predetermined position is determined to be the representative block.

11. The apparatus according to claim 1, wherein said conversion means comprises computing means for computing color information in a destination color space on the basis of color information expressed by labels of a source color space, when a type of source color space is different from a type of destination color space.

12. An image processing method which segments an image into a plurality of blocks, and expresses the image by color label string data by assigning color labels to the segmented blocks in correspondence with feature amounts, comprising:

an input step, of inputting source color label string data and attribute information thereof;

a designation step, of designating attribute information of converted color label string data;

a determination step, of determining whether or not the attribute information of the source color label string data is the same as the attribute information of the converted color label string data designated in said designation step; and a conversion step, of, if it is determined in said determination step that the attribute information of the source color label string data is not the same as the attribute information of the converted color label string data, converting the source color label string data into destination color label string data on the basis of the attribute information input in said input step, and the attribute information designated in said designation step.

13. A storage medium, capable of being read by a computer, storing a program for executing a method for controlling an image processing apparatus, which segments an image into a plurality of blocks, and expresses the image by color label string data by assigning color labels to the segmented blocks in correspondence with feature amounts, when the program code is loaded and executed by a computer, the method comprising the steps of:

inputting source color label string data and attribute information thereof;

designating attribute information of converted color label string data;

determining whether or not the attribute information of the source color label string data is the same as the attribute information of the converted color label data designated in said designation step; and if it is determined in said determination step that the attribute information of the source color label string data is not the same as the attribute information of the converted color label string data, converting the source color label string data into destination color label string data on the basis of the attribute information input in said input step, and the attribute information designated in said designation step.

14. A computer program product stored in a computer readable medium for executing an image processing method which segments an image into a plurality of blocks, and expresses the image by color label string data by assigning color labels to the segmented blocks in correspondence with feature amounts, said program comprising:

code for an input step, of inputting source color label string data and attribute information thereof;

code for a designation step, of designating attribute information of converted color label string data;

code for a determination step, of determining whether or not the attribute information of the source color label string data is the same as the attribute information of the converted color label string data designated in said designation step; and code for a conversion step, of if it is determined in said determination step that the attribute information of the source color label string data is not the same as the attribute information of the converted color label string data, converting the source color label string data into destination color label string data on the basis of the attribute information input in said input step, and the attribute information designated in said designation step.

* * * * *

UNITED STATES PATENT AND TRADEMARK OFFICE
CERTIFICATE OF CORRECTION

PATENT NO. : 6,731,789 B1
DATED : May 4, 2004
INVENTOR(S) : Hiroshi Tojo

It is certified that error appears in the above-identified patent and that said Letters Patent is hereby corrected as shown below:

Column 1,
Line 23, "frequency" should read -- frequently --.

Column 4,
Line 22, "an" should read -- a --; and
Line 63, "($R_5$, $G_5$, $B_5$)" should read -- ($R_5$, $G_5$, $B_5$), --.

Column 11,
Line 3, "occurrence)." should read -- occurrence. --.

Column 16,
Line 9, "color label data" should read -- color label string data --; and
Line 34, "of" should read -- of, --.

Signed and Sealed this

Third Day of May, 2005

JON W. DUDAS
*Director of the United States Patent and Trademark Office*